(12) United States Patent
Okumura

(10) Patent No.: US 6,474,146 B2
(45) Date of Patent: Nov. 5, 2002

(54) ROTARY SENSOR CAPABLE OF HIGH-PRECISION DETECTION OF ROTATION ANGLE TRANSMITTED FROM OUTSIDE

(75) Inventor: Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/388,392

(22) Filed: Sep. 1, 1999

(65) Prior Publication Data

US 2002/0139179 A1 Oct. 3, 2002

(30) Foreign Application Priority Data

Sep. 3, 1998 (JP) .......................................... 10-249344

(51) Int. Cl.⁷ ........................... G01M 19/00; G01L 3/02
(52) U.S. Cl. .................................. 73/118.1; 73/862.193
(58) Field of Search ............................... 73/118.1, 116, 73/862.193, 862; 338/68; 29/613

(56) References Cited

U.S. PATENT DOCUMENTS 5,088,319 A * 2/1992 Hirose et al. ............... 73/118.1
5,460,035 A * 10/1995 Pfaffenberger ............. 73/118.1

FOREIGN PATENT DOCUMENTS

DE 86 14 601 U1 9/1986
DE 42 11 616 A1 10/1993

* cited by examiner

Primary Examiner—Benjamin R. Fuller
Assistant Examiner—Maurice Stevens
(74) Attorney, Agent, or Firm—Brinks Hofer Gilson & Lione

(57) ABSTRACT

A rotary sensor comprises: a drive shaft having a flat portion at a forward end portion; a rotator provided with an engagement hole having a flat portion in which the forward end portion of the drive shaft is inserted; an elastic member having an elastic contact portion; and a rotation angle sensing member for detecting the rotation angle of the rotator; the rotator having a groove formed in parallel with the flat portion adjacently to the flat portion of the engagement hole, and a partition wall between the groove and the flat portion of the engagement hole; the partition wall having an open portion, through which the engagement hole communicates with the groove, and formed to a specific depth from the opening of the engagement hole; and the elastic contact portion of the elastic member inserted in the groove being projected to the engagement hole side through the open portion, into elastic contact with the flat portion of the drive shaft.

9 Claims, 4 Drawing Sheets

ROTARY SENSOR CAPABLE OF HIGH-PRECISION DETECTION OF ROTATION ANGLE TRANSMITTED FROM OUTSIDE

BACKGROUND OF THE INVENTION

1. Field of the Invention

This invention relates to a rotary sensor and more particularly to a rotary sensor capable of detecting with high precision a rotation angle transmitted from outside.

2. Description of Related Art

A conventional rotary sensor has an unillustrated housing of an approximately cylindrical external shape, in which a disk-like rotator 1 is housed as shown in FIG. 10. The rotator 1 has a bearing portion 1b which projects to the right in the drawing from the center of a disk-shaped flange 1a. At the center of rotation of the bearing portion 1b, an oval-shaped shaft hole 1c is formed to a specific depth. In a part of the flange 1a near the root of the bearing portion 1b, a spring retaining portion 1d is projectively formed.

Around the bearing portion 1b a torsion coil spring 2 is mounted to elastically force the rotator 1 in a direction of rotation. The torsion coil spring 2 is retained at one end by the spring retaining portion 1d and at the other end on the housing side not shown.

On the left side surface of the flange 1a of the rotator 1 a slider piece not depicted is attached. On the opposite side of this slider piece an unillustrated resistor board on which a resistor pattern is formed is disposed. When the slider piece slides in elastic contact with the resistor pattern with the rotation of the rotator, the resistance value varies, thereby enabling detection of rotation angle of the rotator.

The conventional rotary sensor in use as an unillustrated throttle valve rotation sensor on an automobile will be explained. The throttle valve is coupled with the drive shaft 3 which transmits rotation of the throttle valve. The forward end 3a of drive shaft 3 is formed oval in configuration. When the conventional rotary sensor is attached on the throttle valve side and the drive shaft 3 is inserted into the shaft hole 1c of the rotator 1, the rotation of the drive shaft 3 is transmitted to the rotator 1.

The drive shaft 3 stated above is somewhat loose, and relatively off-centered, in a radial direction orthogonal to the axial direction because of assembly requirements of components on the throttle valve side. Absorption of this looseness or deviation from center of the drive shaft 3 has been required on the rotary sensor side.

In the conventional rotary sensor, therefore, the oval shaft hole 1c is made slightly larger in width and diameter than the forward end portion 3a of the drive shaft 3, so that the drive shaft 3 may be loose-fit in the shaft hole 1c to absorb the radial looseness and relative deviation from center of the drive shaft 3.

Since the drive shaft 3 is loose-fit in the shaft hole 1c, there occurs a backlash with the rotator 1 when the rotator 1 is rotated by the driven shaft 3, causing an error in the rotation of the rotator 1, resulting in a failure in proper detection of rotation angle on the drive shaft 3 side. To obviate this drawback, the torsion coil spring 2 is adopted to constantly apply an elastic force to the rotator 1 in one direction towards rotation in relation to the drive shaft 3, thus absorbing the backlash.

That is, when the drive shaft 3 rotates in one direction, the rotator 1 rotates in one direction against the spring force of the torsion coil spring 2. When the drive shaft 3 rotates in the other direction, the rotator 1 is independently rotated in the same direction with the spring force of the torsion coil spring 2.

The rotation angle of the drive shaft 3, therefore, cannot be detected with high precision if the drive shaft 3 has radical looseness in a radical direction and relative deviation from center.

The conventional rotary sensor stated above, however, has such a problem that the torsion coil spring 2 used therein is expensive because of a special configuration and accordingly the high cost of the rotary sensor results.

Since the drive shaft 3 is loose-fit in the shaft hole 1c, there will take place friction between the drive shaft 3 and the shaft hole 1c during a long-time use, resulting in difficult high-precision detection of rotation angle.

SUMMARY OF THE INVENTION

In view of the above-described problems of the heretofore known rotary sensor, it is an object of this invention to provide a rotary sensor which ensures high-precision detection of rotation angle by absorbing looseness and relative deviation, if any, from center of the drive shaft 3 with respect to the rotary sensor.

As the first arrangement for solving to the above-described problems, the rotary sensor of this invention is comprised of a drive shaft having a flat portion at the forward end portion, a rotator provided with an engagement hole having a flat portion in which the forward end portion of the drive shaft is inserted, an elastic member having an elastic contact portion, and a rotation angle sensing member for detecting the rotation angle of the rotator; the rotator having a groove formed in parallel with the flat portion adjacently to the flat portion of the engagement hole, and a partition wall between the groove and the flat portion of the engagement hole; the partition wall having an open portion, through which the engagement hole communicates with the groove, from the opening to a specific depth of the engagement hole; and the elastic contact portion of the elastic member inserted in the groove projecting to the engagement hole side through the open portion, into elastic contact with the flat portion of the drive shaft.

As the second arrangement for solving to the above-described problems, the elastic member is made of a plate spring and the elastic contact portion is projectively formed with the plate spring partly curved. The crest of this curved part is projected to the engagement hole side into elastic contact with the flat portion of the drive shaft.

Furthermore, as the third arrangement for solving to the above-described problems, the elastic member has a retaining portion formed by raising on the opposite direction of projection of the elastic contact portion, to thereby retain the elastic member.

Furthermore, as the fourth arrangement for solving to the above-described problems, a through hole is formed in the curved crest part of the elastic contact portion.

DESCRIPTION OF THE PREFERRED EMBODIMENTS

Figure 2:
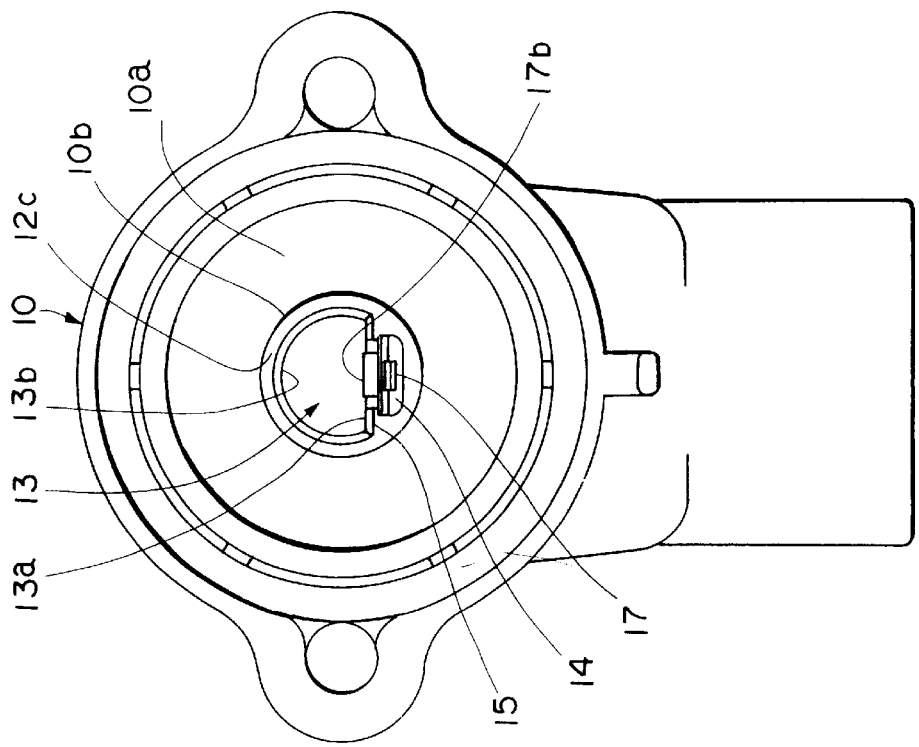
FIG. 2 is a schematic front view of the rotary sensor of this invention.
Figure 1:
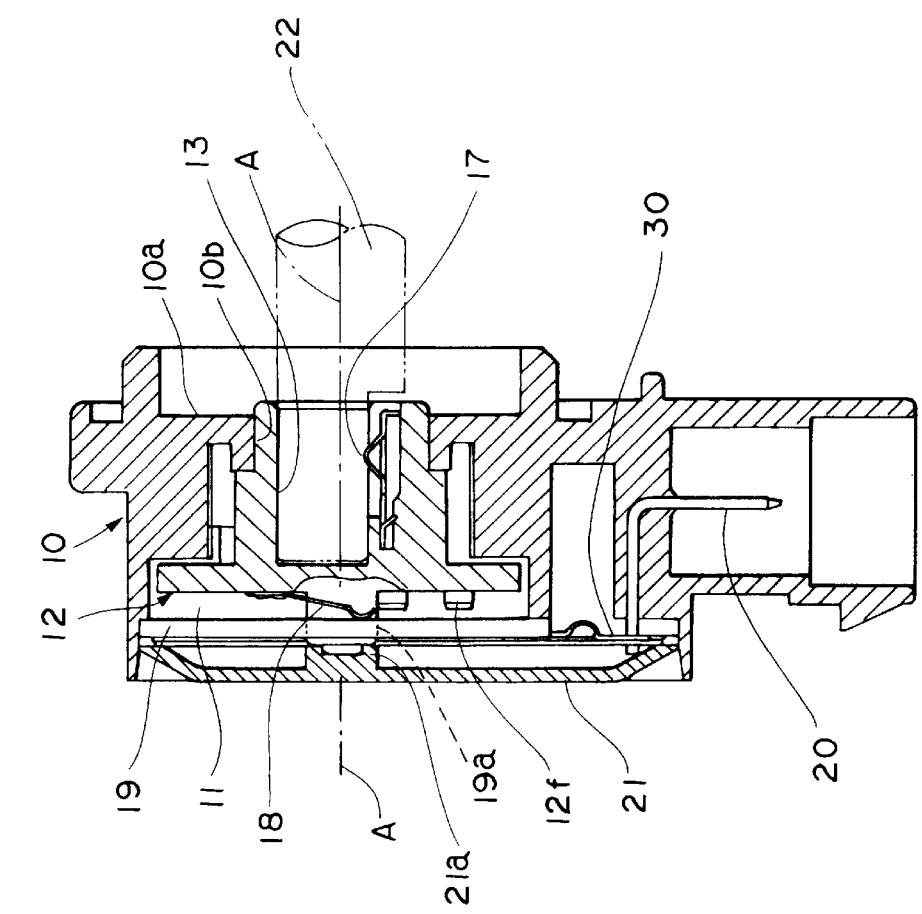
FIG. 1 is a sectional view of a major portion of a rotary sensor of this invention.
Figure 3:
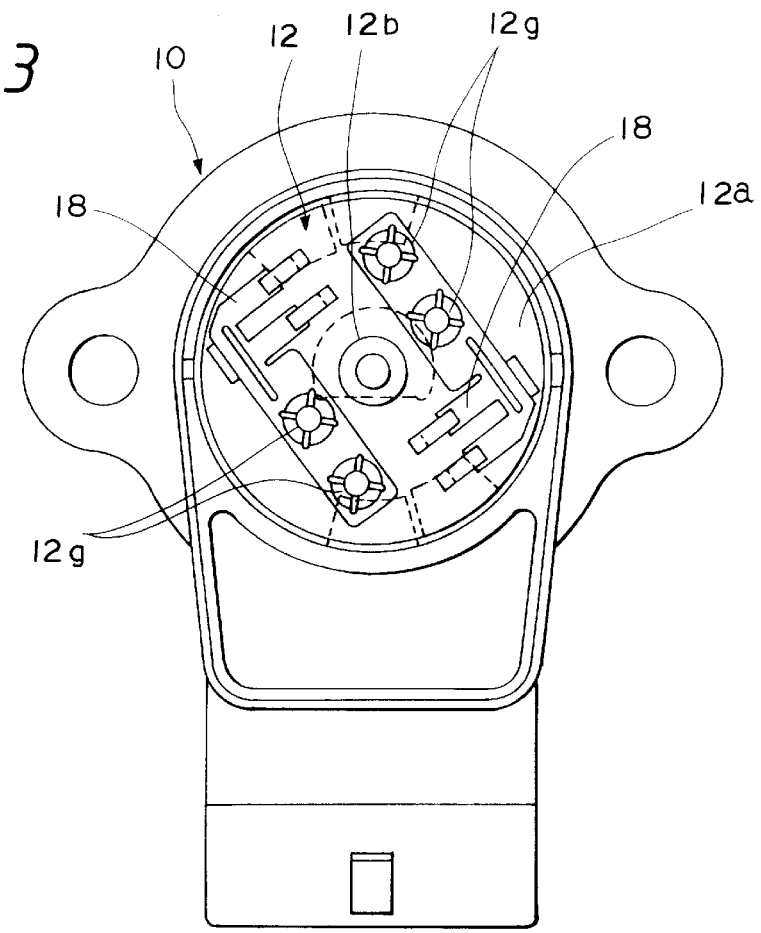
FIG. 3 is a rear view of a major portion of the rotary sensor of this invention.
Figure 4A:
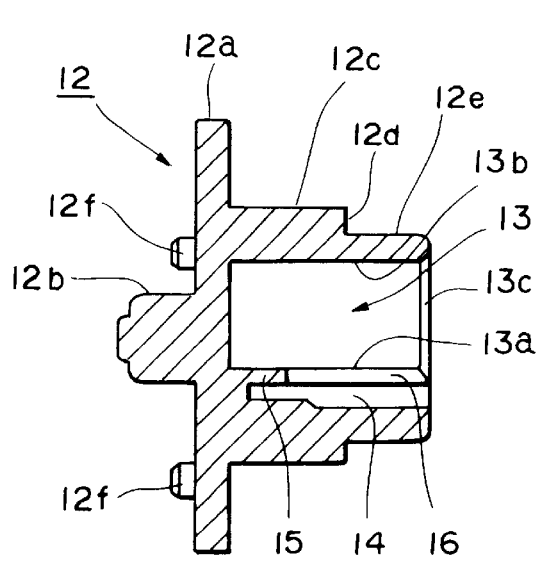
FIGS. 4A and 4B are a sectional view and a side view of a major portion of the rotator of this invention, respectively.
Figure 4B:
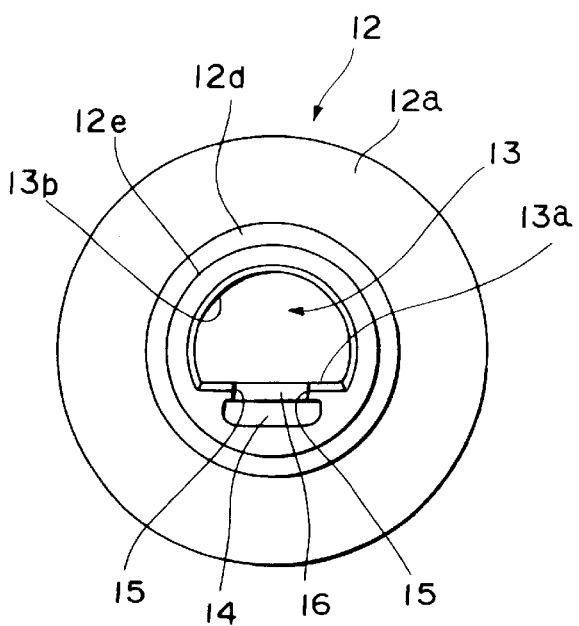
Figure 5:
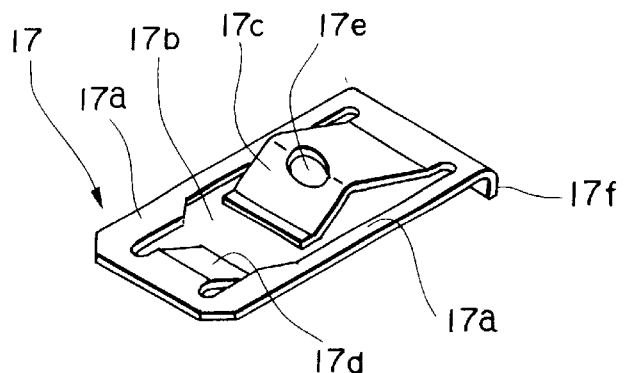
FIG. 5 is a perspective view of an elastic member of this invention.
Figure 6A:
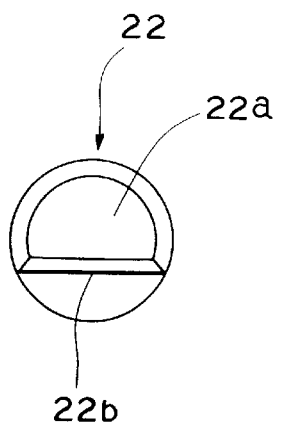
FIGS. 6A and 6B are a front view and a side view of a drive shaft of this invention, respectively.
Figure 6B:
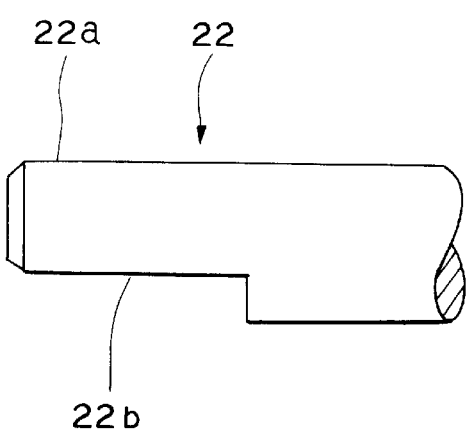
Figure 7:
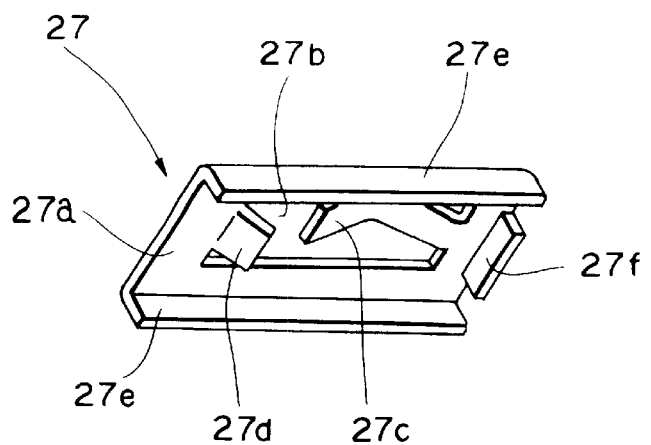
FIG. 7 is a perspective view explaining a modification of the elastic member of this invention.
Figure 8:
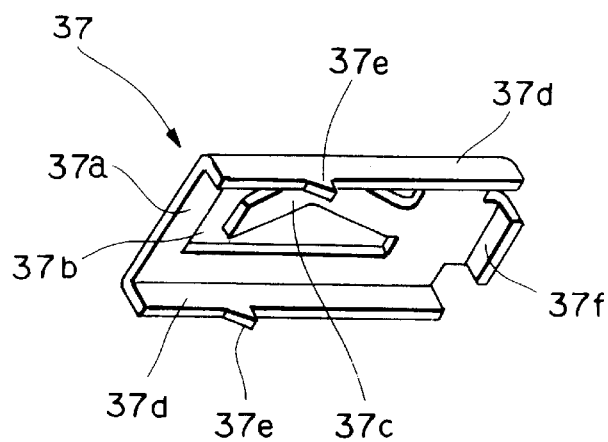
FIG. 8 is a perspective view explaining the modification of the elastic member of this invention.
Figure 9:
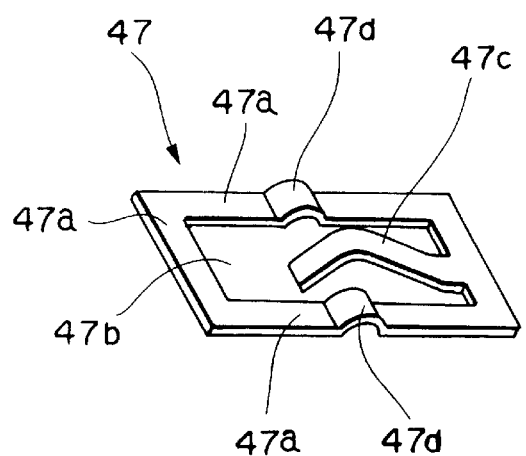
FIG. 9 is a perspective view explaining a modification of the elastic member of this invention.
Figure 10:
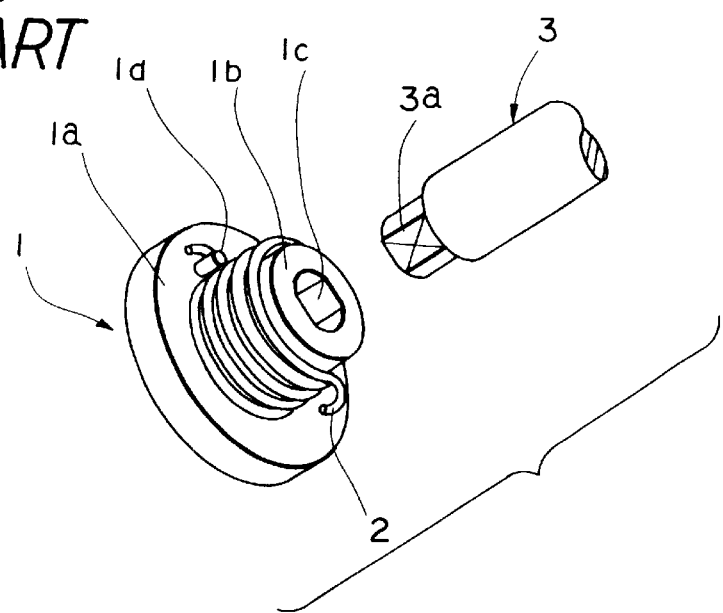
FIG. 10 is a perspective view of a major portion of a conventional rotary sensor.

One embodiment of a rotary sensor of this invention will hereinafter be described with reference to the accompanying drawings. FIG. 1 is a sectional view showing a major portion of the rotary sensor of this invention; FIG. 2 is a schematic front view of the rotary sensor of this invention; FIG. 3 is a rear view of a major portion of the rotary sensor of this invention; FIGS. 4A and 4B are a sectional view and a front view of a major portion of a rotator of this invention, respectively; FIG. 5 is a perspective view of an elastic member of this invention; FIGS. 6A and 6B are a front view and a side view of a drive shaft of this invention, respectively; and FIGS. 7 to 9 are perspective views explaining modifications of the elastic member of this invention.

The rotary sensor of this invention, as shown in FIG. 1, is provided with a housing 10 made of a thermosetting resin, which has an approximately cylindrical outside shape. The housing 10 has a front side plate 10a formed on the right side in the drawing, and a shaft hole 10b formed at the central part of the front side plate 10a.

In the housing 10 an approximately cylindrical housing section 11 is formed. A rotator 12 is disposed within the housing section 11. The rotator 12, as shown in FIG. 4, has a disk-like flange 12a, on the left and right sides in the drawing of which a small-diameter shaft portion 12b and a large-diameter bearing portion 12c are projectively formed respectively.

On the bearing portion 12c a step 12d is formed. On the right of this step 12d in the drawing is formed a small-diameter forward end portion 12e. The forward end portion 12e is inserted into a shaft hole 10b of the housing 10, so that the rotator 12 is rotatable on the centerline A as the center of rotation within the housing section 11.

On the left side surface of the flange 12a in the drawing, a plurality of projections 12f are projectively formed, to thereby position and attach a later-described slider piece 18.

On the center of rotation of the bearing portion 12c, an engagement hole 13 of specific depth is formed. The engagement hole 13 includes a flat portion 13a and a circular portion 13b, and is formed in a D shape as viewed from the front and chamfered at the opening portion 13c.

Adjacently to the flat portion 13a of the engagement hole 13, a groove 14 of specific depth and width is formed in parallel with the flat portion 13a.

A partition wall 15 is formed between the groove 14 and the flat portion 13a of the engagement hole 13. At the partition wall 15, an open portion 16 through which the engagement hole 13 and the groove 14 communicate with is formed to a specific depth from the opening 13c of the engagement hole 13. The open portion 16, as shown in FIG. 4B, is formed smaller in width than the groove 14 and therefore the partition wall 15 projects on both sides of the open portion 16.

The groove 14 is formed to allow insertion of an elastic member 17 made of a plate spring. The elastic member 17, as shown in FIG. 5, has a cutout portion 17b formed by punching a base plate portion 17a with a press. Surrounded with the cutout portion 17b, a tongue-shaped elastic contact portion 17c and a retaining portion 17d are formed.

The elastic contact portion 17c is curved in an angle shape, projecting upwardly in the drawing. On the downward side in the drawing, that is, in the opposite direction of projection of the elastic contact portion 17c, a retaining portion 17d is formed by raising.

The elastic member 17 is provided with a through hole 17e of specific diameter formed by punching in the crest curved part of the elastic contact portion 17b, and a support portion 17f of specific height is formed by bending to the downward side in the same direction as the retaining portion 17d at the right end in the drawing.

As the elastic member 17 is inserted into the groove 14, the retaining portion 17d at one end side is elastically interposed between the lower side walls of the groove 14 and the support portion 17f on the other end side contacts the side walls of the groove 14. The level base plate portion 17a is pressed into elastic contact with the partition wall 15 on the side surface mainly of the open portion 16 by the elastic force of the retaining portion 17d. And the elastic member 17 is retained in the groove 14.

When the elastic member 17 is inserted into the groove 14, the curved crest part of the elastic contact portion 17c is positioned on the engagement hole 13 side, protruding through the open portion 16.

On the left side surface, in the drawing, of the flange 12a of the rotator 12 where the shaft portion 12b is formed, a resilient slider piece 18 which is a part of the rotation angle sensing member is attached. The slider piece 18 is positioned by means of a plurality of projections 12f formed on the flange 12a as shown in FIG. 3, and is fixedly attached to the rotator 12 by thermal caulking or the like.

On the opposite side of the surface on which the slider piece 18 is mounted, a resistor board 19 having a specific amount of clearance is positioned inside the housing 10 and securely attached by use of adhesive.

On the surface of the resistor board 19 an unillustrated resistor pattern is formed by printing, so that the slider piece 18 may elastically come into contact with the resistor pattern.

At the central part of the resistor board 19 there is formed a shaft hole 19a in which the shaft portion 12b of the rotator 12 is inserted. The rotation angle sensing member is made up of the resistor board 19 having the slider piece 18 and the resistor pattern.

In FIG. 1, below the resistor board 19 a plurality of approximately L-shaped external terminals 20 are unitarily formed with the housing 10 by an insert molding process. The external terminals 20 are connected by soldering to a terminal 30 led out from the end face of the resistor board 19 correspondingly to the resistor pattern.

In the drawing, on the left side of the resistor board 19 a cover 21 for covering the housing section 11 in the housing 10 is attached by adhesive, thereby hermetically enclosing the interior of the housing section 11. On the inner side on the centerline A of the cover 21, a bearing portion 21a is projectively formed as shown in FIG. 1 to support the shaft portion 12b of the rotator 12, thereby preventing movement of the rotator 12 in a direction perpendicular to the direction of the centerline A and preventing looseness.

To detect the rotation angle of a throttle valve on for instance an automobile by using the rotary sensor of this invention of the aforesaid configuration, first the housing 10 is attached to the body of the throttle body not depicted. Then, as shown in FIG. 1, a drive shaft 22 coupled with the throttle valve is inserted and positioned in the engagement hole 13 of the rotator 12.

The drive shaft 22, as shown in FIG. 6, is of such a shape that a round rod-like forward end portion 22a is provided with a flat portion 22b to form a D-shaped forward end portion 22a. The drive shaft 22 is designed to reciprocate within the specific range of rotation angle in interlock with the rotation of the throttle valve on the automobile side.

The drive shaft 22 stated above has a slight looseness of for instance about 0.1 mm, and relative center deviation, in the radial direction because of an assembly error on the throttle valve side. To properly engage the drive shaft 22 in the engagement hole 13 notwithstanding the presence of the looseness or center deviation, a play is provided between the drive shaft 22 and the engagement hole 13; and after assembling, the play is removed by holding the elastic contact portion 17c of the elastic member 17 in elastic contact with the flat portion 22b of the drive shaft 22 to thereby press the circular portion 13b of the engagement hole 13 against the drive shaft 22 side. Both the drive shaft 22 and the rotator 12 thus rotate as one body without the play.

Therefore, as the drive shaft 22 rotates in one direction, the rotator 12 can smoothly rotate without a backlash, following the rotation of the drive shaft 22. Even when the drive shaft 22 rotates in the other direction also, the rotator 12 can smoothly rotate, following the rotation of the drive shaft 22 without any backlash, due to the resilience of the elastic member 17. The rotation angle sensing member composed of the slider piece 18, therefore, can perform high-precision detection of rotation angle of the drive shaft 22.

Referring to FIG. 7 to FIG. 9, modifications of the elastic member 17 used in the rotary sensor of this invention will be explained. First, the elastic member 27 shown in FIG. 7 has a cutout portion 27b formed by punching the base plate portion 27a, thus forming a curved elastic contact portion 27c and a retaining portion 27d. The base plate portion 27a is bent downwardly on both sides in the drawing in the longitudinal direction, to thereby form the first support portions 27e, 27e. On the end of the base plate portion 27a where the elastic contact portion 27c is formed, a second support portion 27f is formed by bending to the same height as the first support portions 27e. The elastic member 27, provided with the first support portions 27e, 27e thus formed, can reliably be fitted without looseness within the groove 14 and the drive shaft 22 can reliably be pressed in the engagement hole 13 by means of the elastic contact portion 27c.

The elastic member 37 shown in FIG. 8 has a curved elastic contact portion 37c in the cutout portion 37b formed in the base plate portion 37a. The base plate portion 37a is bent at the end in the longitudinal direction to thereby form first support portions 37d, 37d. On the lower end face of the first support portions 37d, 37d, downwardly projecting wedge-shaped retaining portions 37e, 37e are formed.

The base plate portion 37a having the elastic contact portion 37c thus formed is also provided at the end with a second support portion 37f formed by bending to the same height as the first support portion 37d. The elastic member 37 thus formed can be retained with reliability in the groove 14 by means of the wedge-shaped retaining portions 37e, 37e and the drive shaft 22 can be elastically pressed firmly in the engagement hole 13 by means of the elastic contact portion 37c.

The elastic member 47 shown in FIG. 9 is provided with a curved elastic contact portion 47c formed by punching a cutout portion 47b in an approximately square base plate portion 47a. An almost central part, in the longitudinal direction, of the base plate portion 47a, is protruding in a circular form in the same direction as the direction of the curved elastic contact portion 47c, forming the retaining portions 47d, 47d.

The elastic member 47 of such a configuration can easily be manufactured and elastically press to retain the drive shaft 22 in the engagement hole 13 with reliability by means of the elastic contact portion 47c.

In the embodiments of this invention heretofore explained, the rotation angle sensing member is a resistor type made up of a slider piece 18. It is to be noted, however, that the rotation angle sensing member may be a magnetic type not depicted or other fitted with a magnetic member on the outer periphery of the flange 12a of the rotator 12.

The rotator of the rotary sensor of this invention is provided with a groove formed in parallel with the flat portion adjacently to the flat portion of the engagement hole, and a partition wall between the groove and the flat portion of the engagement hole. The partition wall has an open portion of a specific depth from the opening of the engagement hole, through which the engagement hole and the groove communicate with. The elastic contact portion of the elastic member inserted in the groove protrudes through the open portion out to the engagement hole side and into elastic contact with the flat portion of the drive shaft. Therefore, if the drive shaft is inserted loose-fit in the engagement hole, the rotator can rotate without a backlash with rotation of the drive shaft. This invention, therefore, can provide a rotary sensor capable of detecting the rotation angle of the drive shaft with high precision by means of the sensing member.

The elastic member is produced of a plate spring; and the elastic contact portion is projectively formed by curving a part of the plate spring. The curved crest part protrudes to the engagement hole side into elastic contact with the flat portion of the drive shaft. It is, therefore, possible to easily make the elastic member on a press to thereby reduce the cost.

The elastic member has a retaining portion formed by cutting and bending up on the opposite side of direction of projection of the elastic contact portion, so that the elastic member is retained by this retaining portion. The elastic member, therefore, can be seated reliably in the groove by means of the retaining portion. Therefore, it is possible to prevent the elastic member from coming out and off the groove if the there has occurred looseness in the thrust direction, or in the axial direction of the drive shaft.

Furthermore, as a through hole is formed in the curved crest part of the elastic contact portion, it is possible to increase the spring pressure per unit area for elastically pressing the elastic contact portion against the flat portion of the drive shaft, and accordingly to reliably press to connect the rotator to the drive shaft.

What is claimed is:
1. A rotary sensor, comprising:
   a housing having a bearing and a shaft hole;
   a drive shaft having a flat portion formed on a side thereof adjacent to press against an inner surface of to a forward end of said drive shaft, said drive shaft having a central axis about which said drive shaft rotates;

a rotator rotatably disposed within said housing so as to rotate about the central axis of said drive shaft, said rotator having a shaft portion that is rotatably supported by the bearing of said housing, said rotator having a bearing portion that is slidably supported within the shaft hole of said housing, said bearing portion being provided with an engagement hole having an opening into which said forward end of said drive shaft is inserted, said opening having a flat inner wall portion extending in parallel with a central axis of said engagement hole, the flat portion of said drive shaft being disposed against said flat inner wall portion of said engagement hole;

an elastic member having an elastic contact portion; and a rotation angle sensing member for detecting a rotation angle of said rotator;

wherein said rotator further comprises a groove formed therein, said groove being formed in parallel with the central axis of said engagement hole, said groove being separate from said engagement hole and formed adjacent to the flat inner wall portion of said engagement hole;

wherein said flat inner wall portion has an open portion in communication with said engagement hole and with said groove; and wherein said elastic member is affixed to said rotator by being inserted into said groove with said elastic contact portion being projected towards the central axis of said engagement hole through said open portion, said elastic contact portion being in resilient contact with said flat portion of said drive shaft so as to cause an outer surface of said drive shaft to press against an inner surface of said engagement hole.

2. A rotary sensor according to claim 1, wherein said elastic member is made from a plate spring, and said elastic contact portion is formed by bending a portion of said plate spring to form a curved part having a crest, the crest of said curved part being projected towards the central axis of said engagement hole and into press contact with said flat portion of said drive shaft.

3. A rotary sensor according to claim 2, wherein said elastic member has a retaining portion for retaining said elastic member in said groove, said retaining portion formed by bending a portion of said plate spring in a direction that is opposite from said elastic contact portion.

4. A rotary sensor according to claim 2, wherein a through hole is formed in the crest of said curved part of said elastic contact portion.

5. A rotary sensor according to claim 1, wherein said rotator further comprises a partition wall formed between said groove and said flat inner wall portion of said engagement hole, said open portion being formed through said partition wall.

6. A rotary sensor according to claim 5, wherein the opening in said partition wall has a width and a depth that is less than a width and a depth of said groove.

7. A rotary sensor according to claim 5, wherein said partition wall comprises an inner surface and an outer surface, said inner surface forming the flat inner wall portion of said engagement hole, said outer surface being spaced apart from said inner surface and from said engagement hole, and wherein said elastic member is disposed against the outer surface of said partition wall.

8. A rotary sensor, comprising:

a housing having a bearing and a shaft hole;

a drive shaft having a flat portion formed on a side thereof adjacent to a forward end of said drive shaft, said drive shaft having a central axis about which said drive shaft rotates;

a rotator rotatably disposed within said housing so as to rotate about the central axis of said drive shaft, said rotator having a shaft portion that is rotatably supported by the bearing of said housing, said rotator having a bearing portion that is slidably supported within the shaft hole of said housing, said bearing portion being provided with an engagement hole having an opening into which said forward end of said drive shaft is inserted, said opening having a flat inner wall portion extending in parallel with a central axis of said engagement hole, the flat portion of said drive shaft being disposed against said flat inner wall portion of said engagement hole;

an elastic member comprising plate-like base portion and an elastic contact portion, said base portion being formed of a metallic plate spring, said elastic contact portion being formed by bending a portion of said plate spring to form so as to project outwardly from said base portion; and a rotation angle sensing member for detecting a rotation angle of said rotator, said rotation angle sensing member comprising a slider piece disposed on said rotator and a resistor disposed on said housing, said slider piece being arranged so as to slide on said resistor piece upon rotation of said rotator;

wherein said rotator further comprises a groove formed therein, said groove being formed in parallel with the central axis of said engagement hole, said groove being separate from said engagement hole and formed adjacent to the flat inner wall portion of said engagement hole;

wherein said rotator further comprises a partition wall formed between said groove and said flat inner wall portion of said engagement hole;

wherein said flat inner wall portion has an open portion in communication with said engagement hole and with said groove, said open portion being formed through said partition wall; and wherein said elastic member is affixed to said rotator by being inserted into said groove with said elastic contact portion being projected towards the central axis of said engagement hole through said open portion, said elastic contact portion being in resilient contact with said flat portion of said drive shaft so as to cause an outer surface of said drive shaft to press against an inner surface of said engagement hole, the base portion of said elastic member being disposed against an outer surface of said partition wall so as to be held within said groove.

9. A rotary sensor according to claim 8, wherein said elastic member is formed by punching the base portion and bending a portion enclosed by the punched portion in such a manner that it projects outwardly from the base portion.

* * * * *